(12) United States Patent
Jindal et al.

(10) Patent No.: US 12,047,278 B1
(45) Date of Patent: Jul. 23, 2024

(54) GROUPING ROUTE-BASED VIRTUAL PRIVATE NETWORK INTERFACES IN A VIRTUALIZED COMPUTING SYSTEM

(71) Applicant: VMWARE, INC., Palo Alto, CA (US)

(72) Inventors: Gaurav Jindal, Pune (IN); Neeraj Mantri, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/125,758

(22) Filed: Mar. 24, 2023

(30) Foreign Application Priority Data

Jan. 12, 2023 (IN) .............................. 202341002544

(51) Int. Cl.
*H04L 45/24* (2022.01)
*H04L 12/46* (2006.01)
*H04L 45/586* (2022.01)

(52) U.S. Cl.
CPC .......... *H04L 45/24* (2013.01); *H04L 12/4641* (2013.01); *H04L 45/586* (2013.01)

(58) Field of Classification Search
CPC .... H04L 45/24; H04L 12/4641; H04L 45/586
See application file for complete search history.

(56) References Cited

U.S. PATENT DOCUMENTS

| | | | | |
|---|---|---|---|---|
| 11,005,721 | B1 * | 5/2021 | Patki | ..................... H04L 43/065 |
| 11,336,629 | B2 | 5/2022 | Wang et al. | |
| 2013/0346585 | A1 * | 12/2013 | Ueno | ..................... H04L 45/02 709/223 |
| 2018/0041425 | A1 * | 2/2018 | Zhang | ................... H04L 45/745 |
| 2021/0021523 | A1 | 1/2021 | Wang et al. | |
| 2021/0218794 | A1 * | 7/2021 | Jain | ..................... H04L 41/0823 |
| 2021/0281514 | A1 * | 9/2021 | Guo | .................... H04L 41/0896 |
| 2022/0393967 | A1 | 12/2022 | Solanki et al. | |
| 2023/0041081 | A1 * | 2/2023 | Udupa | .................... H04L 45/42 |

OTHER PUBLICATIONS

Extended European Search Report mailed May 27, 2024 in European Patent Application No. 2400006.7, 8 pages.

* cited by examiner

*Primary Examiner* — Michael A Keller
*Assistant Examiner* — Thao D Duong
(74) *Attorney, Agent, or Firm* — Kim & Stewart LLP

(57) ABSTRACT

An example method of identifying an equal cost multipath (ECMP)-enabled route-based virtual private networks (RBVPN) in a virtualized computing system, comprises: obtaining, at a telemetry agent executing in an edge server of a data center, learned routes; identifying, by the telemetry agent from the routes, a destination network and a plurality of next hops associated therewith and a plurality of virtual tunnel interfaces (VTIs); identifying, by the telemetry agent for each of the plurality of VTIs, an associated VPN session; grouping, by the telemetry agent, the VPN sessions identified as associated with the plurality of VTIs into an ECMP-enabled RBVPN; adding, by the telemetry agent, a description of the ECMP-enabled RBVPN to telemetry data; and sending, by the telemetry agent, the telemetry data to a telemetry service.

20 Claims, 3 Drawing Sheets

GROUPING ROUTE-BASED VIRTUAL PRIVATE NETWORK INTERFACES IN A VIRTUALIZED COMPUTING SYSTEM

RELATED APPLICATIONS

Benefit is claimed under 35 U.S.C. 119(a)-(d) to Foreign Application Serial No. 202341002544 filed in India entitled "GROUPING ROUTE-BASED VIRTUAL PRIVATE NETWORK INTERFACES IN A VIRTUALIZED COMPUTING SYSTEM", on Jan. 12, 2023, by VMware, Inc., which is herein incorporated in its entirety by reference for all purposes.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers. SDDC users move through various business cycles, requiring them to expand and contract SDDC resources to meet business needs. This leads users to employ multi-cloud solutions, such as typical hybrid cloud solutions where the SDDC spans across an on-premises data center and a public cloud.

Internet Protocol (IP) security protocols (IPSec) are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints to establish a virtual private network (VPN). The traditional VPN is a policy-based VPN. For a policy-based VPN, a subset of the traffic flowing through an interface is encrypted and encapsulated according to a defined policy (e.g., an access control list). A route-based VPN (RBVPN) is a configuration in which an IPSec VPN tunnel is created between two EPs that is referenced by a route that determines which traffic is sent through the tunnel based on a destination IP address. Instead of selecting a subset of traffic to pass through the VPN tunnel using a defined policy, in an RBVPN all traffic passing through the tunnel interface is encrypted and encapsulated.

In an SDDC, a user can define multiple RBVPNs for use with equal-cost multi-path routing (ECMP) for peer reachability. In a multi-cloud system, there can be many established ECMP-enabled RBVPNs in the SDDCs. However, there is no direct way for a product manager, site reliability engineer, customer support, engineering, etc. to determine if a specific ECMP-enabled RBVPN is configured in an SDDC. This is because VPN session configurations are not aware of underlying route information. VPN sessions use a virtual tunnel interface (VTI) that is programmed as a border gateway protocol (BGP) router with a BGP neighbor as a next hop. Once the VPN session is up, then only BGP comes up and routes are advertised and learned over BGP VTI sessions. This is the point where ECMP routes are installed in the routing table of the edge routers, which is dynamic in nature. As VPN sessions are not aware of underlying route information beforehand, users face challenges when managing and identifying ECMP-enabled RBVPNs in a multi-cloud system.

SUMMARY

An exemplary method of identifying an equal cost multipath (ECMP)-enabled route-based virtual private networks (RBVPN) in a virtualized computing system is described herein. The method includes: obtaining, at a telemetry agent executing in an edge services gateway of a data center, routes learned by the edge services gateway; identifying, by the telemetry agent from the routes, a destination network and a plurality of next hops associated therewith and a plurality of virtual tunnel interfaces (VTIs) of the edge services gateway respectively associated with the plurality of next hops; identifying, by the telemetry agent for each of the plurality of VTIs, an associated VPN session managed by the edge services gateway; grouping, by the telemetry agent, the VPN sessions identified as associated with the plurality of VTIs into an ECMP-enabled RBVPN; adding, by the telemetry agent, a description of the ECMP-enabled RBVPN to telemetry data; and sending, by the telemetry agent, the telemetry data to a telemetry service.

In addition, a non-transitory computer-readable storage medium comprising instructions that cause a computer system to carry out the above method, as well as a computer system configured to carry out the above method, are described.

DETAILED DESCRIPTION

Techniques are described herein for grouping RBVPN interfaces in a virtualized computing system. Techniques described herein find ECMP-enabled RBVPNs based on learned routes. In particular, based on the same learned route with more than one next hop and equal cost, the virtual tunnel interfaces (VTIs) associated with the next hops are mapped to corresponding VPN sessions. The VPN sessions are grouped together on-demand as routes are learned. If a VPN session goes down or route advertisement stops, then that VPN session can be removed from the on-demand group. The groups of VPN sessions correspond to ECMP-enabled RBVPNs and information describing such is sent in telemetry data to a centralized database. The techniques can be performed across SDDCs connected to the centralized database. A user interface (UI) accessing the centralized database can consume the telemetry data and discover and create dynamic groups based on user request. The UI can make use of the telemetry data across clouds to know the number of SDDCs using ECMP-enabled RBVPNs and non-ECMP RBVPNs, present anomalies to a user, and accept configuration changes from the user to mitigate the anomalies. For a particular SDDC, the UI can poll the telemetry data periodically (e.g., every few minutes) from the centralized database using an API based on the SDDC identifier. Then local SDDC UI can display these ECMP Routes based VPN's as DYNAMIC groups in near real time. UI can make use of some dynamic objects construct utilizing this information. Conventionally, there is no dynamic groups and VPN configurations are statically listed. In embodiments, the ECMP-based VPN sessions that are grouped can be assigned to different processor cores in the edge services gateway to improve performance. The data can be used by the edge services gateway to ensure that multiple VPN sessions in the same group are not allocated to the same core for encryption/decryption. If unique cores are not available, the edge services gateway and utilize a round robin or similar mechanism. These and further embodiments are described below with respect to the drawings.

Figure 1:
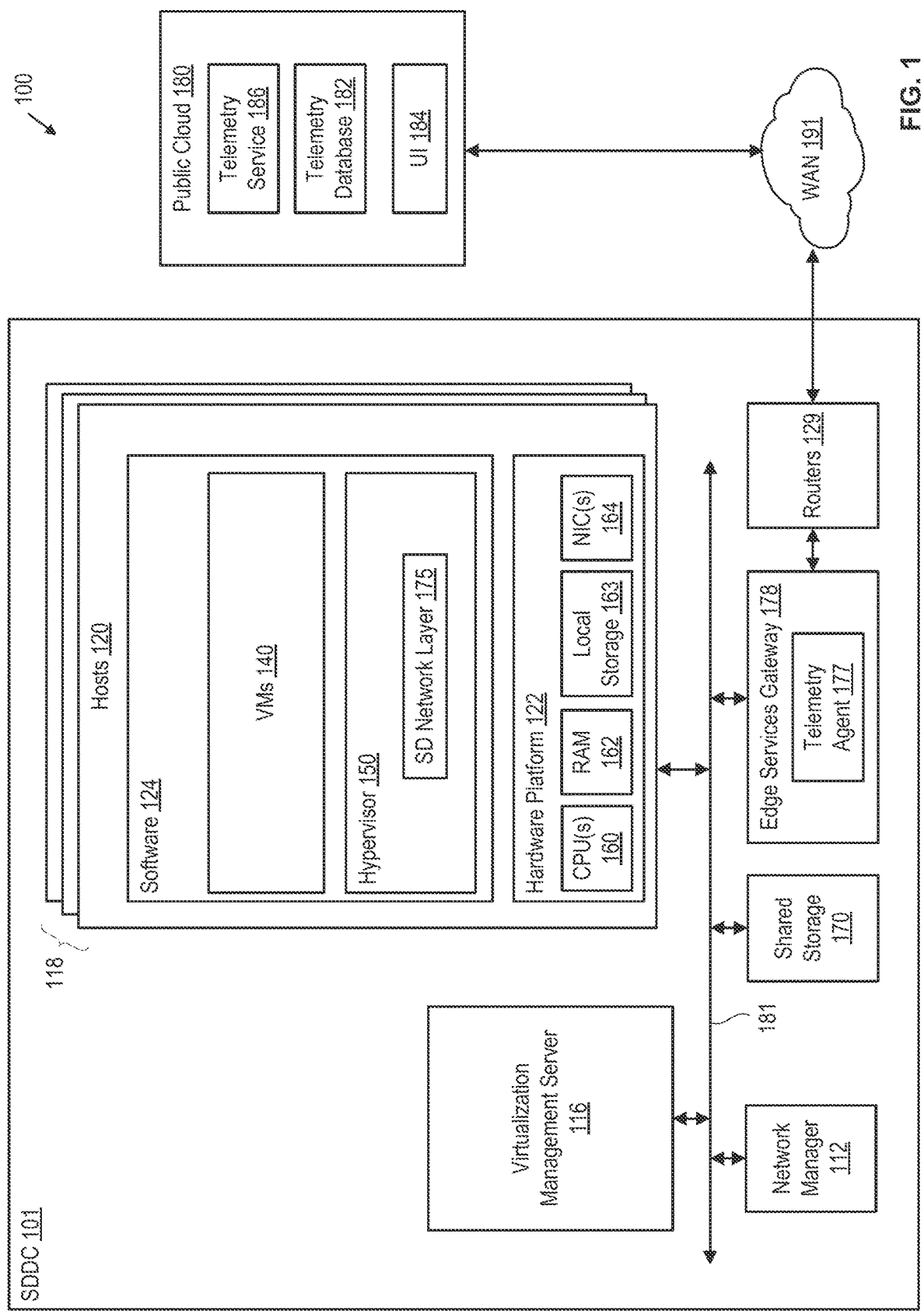
FIG. 1 is a block diagram of a virtualized computing system in which embodiments described herein may be implemented.

FIG. 1 is a block diagram of a virtualized computing system 100 in which embodiments described herein may be implemented. Virtualized computing system includes a software-defined data center (SDDC) 101 in communication with a public cloud 180 through a wide area network (WAN) 191 (e.g., the public Internet).

SDDC 101 includes hosts 120. Hosts 120 may be constructed on hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein).

In the embodiment illustrated in FIG. 1, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

Software 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed.

Virtualized computing system 100 is configured with a software-defined (SD) network layer 175. SD network layer 175 includes logical network services executing on virtualized infrastructure of hosts 120. The virtualized infrastructure that supports the logical network services includes hypervisor-based components, such as resource pools, virtual network switches, virtual routers, and tunnel endpoints, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes an edge services gateway 178 that provide an interface of host cluster 118 to WAN 191. Edge services gateway 178 can include a gateway (e.g., implemented by a router) between the internal logical networking of host cluster 118 and the external network. Edge servers 178 can be physical servers or VMs. Virtualized computing system 100 also includes physical network devices (e.g., physical routers/switches) as part of physical network 181, which are not explicitly shown. Edge services gateways 178 are coupled to WAN 191 through one or more routers 129 (e.g., physical routers).

Virtualization management server 116 is a physical or virtual server that manages hosts 120 and the hypervisors therein. Virtualization management server 116 installs agent (s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. In other embodiments. SD network layer 175 is orchestrated and managed by virtualization management server 116 without the presence of network manager 112.

Public cloud 180 executes telemetry service 186, telemetry database 182, and UI 184. Edge servers 178 execute telemetry agent 177 in communication with telemetry service 186. Telemetry agent 177 is configured to identify a group of VPN sessions corresponding to an ECMP-enabled RBVPN. Telemetry agent 177 can identify one or more ECMP-enabled RBVPNs per edge sever 178. Telemetry agent 177 adds the information to telemetry data that is transmitted to telemetry service 186 and stored in telemetry database 182. A user can access the data in telemetry database 182 through UI 184. The user can visualize and create dynamic groups of VPN sessions as part of ECMP-enabled RBVPNs. The store telemetry information can be used for data visualization and metrics of ECMP-enabled RBVPNs across SDDCs. Although a single SDDC 101 is shown in FIG. 1 by example, the system can include multiple SDDCs each communicating the telemetry data to telemetry service 182 in public cloud 180.

Figure 2:
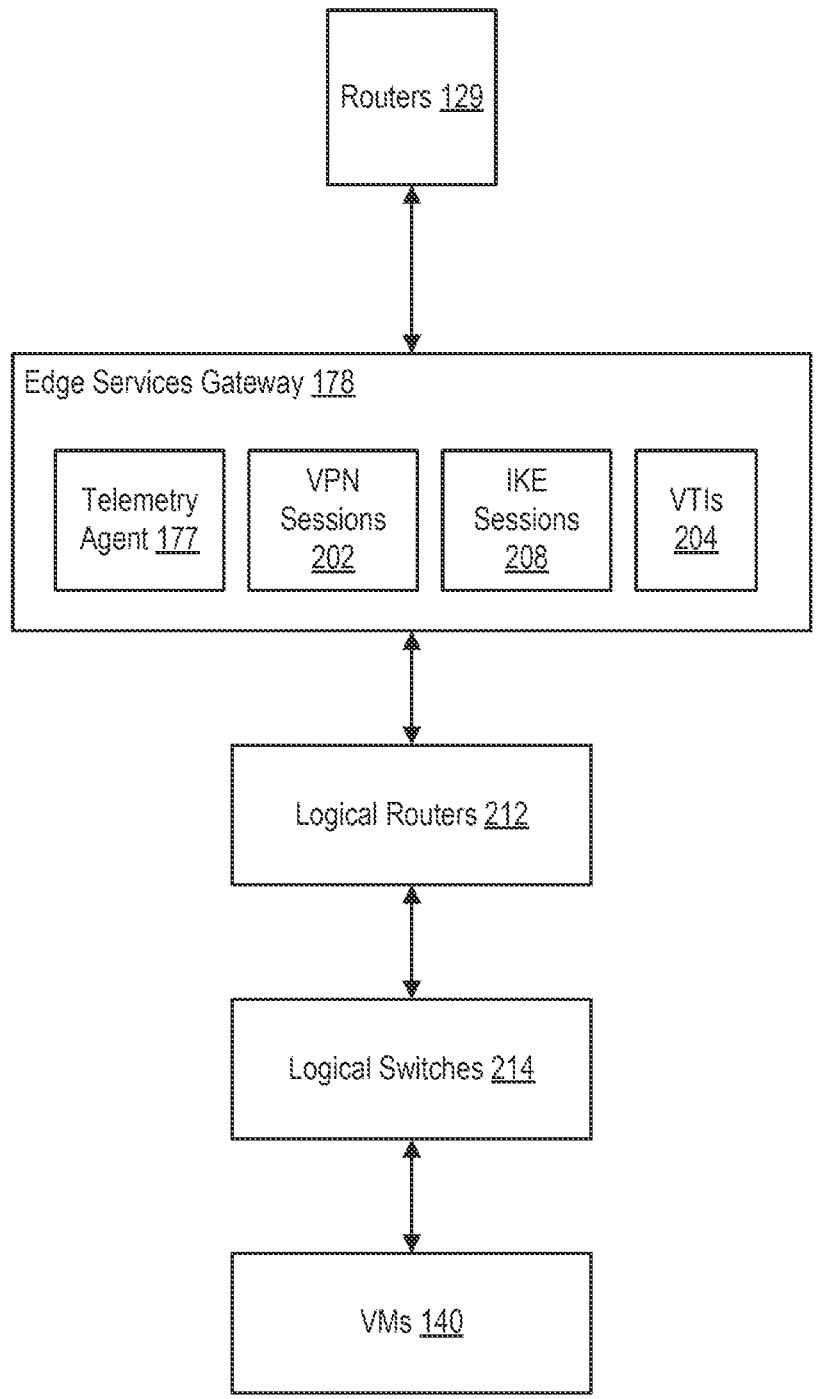
FIG. 2 is a block diagram depicting a network in an SDDC according to embodiments.

FIG. 2 is a block diagram depicting a network in an SDDC according to embodiments. Edge services gateway 178 is coupled between routers 129 and logical routers 212. Logical routers 212 are coupled to logical switches 214, which are coupled to network interfaces of VMs 140. Logical routers 212 and logical switches 214 are part of SD network layer 175 and comprise software components executing as part of hypervisor 150. In embodiments, some logical routers 212 execute of software in edge server 178. Edge services gateway 178 tracks VPN sessions 202 and internet key exchange (IKE) sessions 208 associated with VPN sessions 202. Edge services gateway 178 executes telemetry agent 177 and virtual tunnel interfaces (VTIs) 204.

Figure 3:
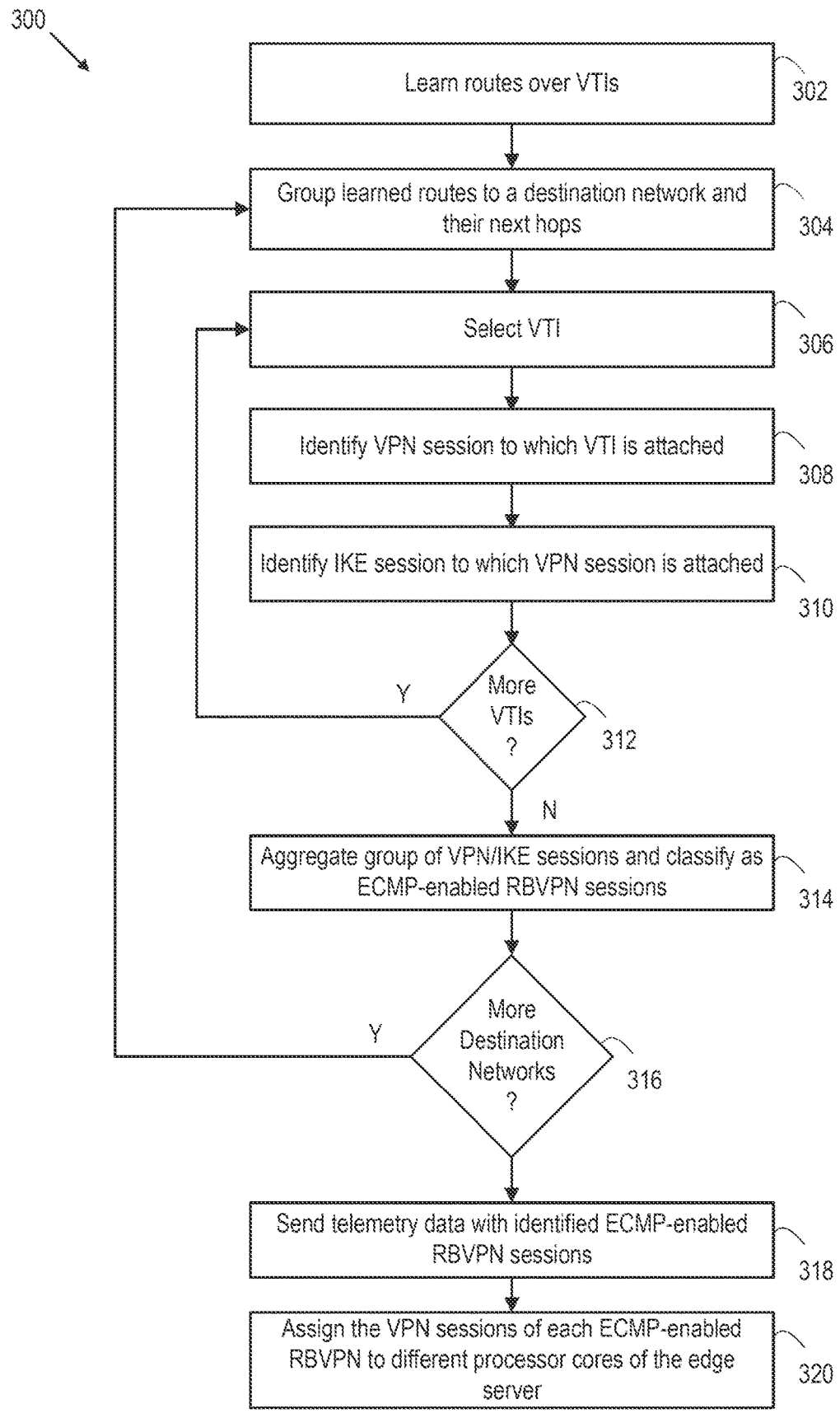
FIG. 3 is a flow diagram depicting a method of identifying ECMP-enabled RBVPNs according to embodiments.

FIG. 3 is a flow diagram depicting a method of identifying ECMP-enabled RBVPNs according to embodiments. Steps in FIG. 3 can be understood with reference to the network shown in FIG. 2. Method 300 begins at step 302, where telemetry agent 177 identifies routes learned by edge services gateway 178 over VTIs 204 using border gateway protocol (BGP). At step 304, telemetry agent 177 processes the learned routes to group a destination network and its next hops having the same weight and metrics. For example, consider the following routes learned by edge services gateway 178:

| | | |
|---|---|---|
| b > * 172.61.0.0/16 [20/100] | via 169.254.155.41 | vti-354, 00:08:01 |
| b > * 172.61.0.0/16 [20/100] | via 169.254.157.41 | vti-359, 00:08:01 |
| b > * 172.61.0.0/16 [20/100] | via 169.254.156.41 | vti-356, 00:08:01 |
| b > * 172.61.0.0/16 [20/100] | via 169.254.158.41 | vti-360, 00:08:01 |

Telemetry agent 177 obtains these routes and groups the destination network with the next hops. In the example, telemetry agent 177 generates the following group:

| | |
|---|---|
| b > * 172.61.0.0/16 | [169.254.155.41, 169.254.157.41, 169.254.156.41, 169.254.158.41] | where 172.61.0.0/16 is the destination network and 169.254.155.41, 169.254.157.41, 169.254.156.41, 169.254.158.41 are the next hops having the same weight. While four next hops are shown in the example, there may be any number of next hops for the same destination network. The next hops are interfaces programmed on logical routers 212 and consumed by VPN sessions or router uplink ports.

At step 306, telemetry agent 177 selects a VTI 204 corresponding to one of the next hops. At step 308, telemetry agent 177 identifies a VPN session 202 to which the selected VTI 204 is attached. Consider the VTI interface 169.254.155.41/30 that has interface identifier (ID) vti-354 in the above example:

Interface: c57a1645-d726-465c-bfb3-7af42e003791
Ifuid: 354
Mode: vti
Port-type: vti
IP/Mask: 169.254.155.42/30

This interface ID is attached to one of VPN sessions 202. For example:

IKE Session ID: 8193
UUID: 9bbd36af-e2d8-4869-aee8-87a9feaf6323
SR ID: 59dcf456-3738-4e21-9496-87572468a974
Type: Route
Auth Mode: PSK
Compliance Suite: NONE
Local IP: 35.163.83.159 Peer IP: 35.166.76.52
Local ID: 35.163.83.159 Peer ID: 35.166.76.52
Session Status: Up
Policy Rules
VTI UUID: c57a1645-d726-465c-bfb3-7af42e003791
ToRule ID: 1068727028 FromRule ID: 3216210676

Local Subnet: 0.0.0.0/0 Peer Subnet: 0.0.0.0/0
Tunnel Status: Up

At step 310, telemetry agent 177 identifies an IKE session 208 to which the VPN session is attached. In the example above, telemetry agent 177 finds that the VPN session is attached to IKE session ID 8193 where the local IP is 35.163.83.159 and the peer IP is 35.166.76.52. At step 312, telemetry agent 177 determines if there are more VTIs in the group of next hops to be processed for the destination network. In the example, VTIs identified by vti-359, vti-356, and vti-360 are yet to be processed. If so, method 300 returns to step 306 where another VTI is selected. If there are no more VTIs to be processed, method 300 proceeds to step 314.

At step 314, telemetry agent 177 aggregates VPN/IKE sessions into a group and classifies the group as sessions of an ECMP-enabled RBVPN. At step 316, telemetry agent 177 determines if there are more destination networks. In the example above, only a single destination network was identified in the learned routes, but an edge services gateway can learn routes across multiple destination networks. If there are more destination networks to be processed, method 3X) returns to step 304 and repeats for another destination network. Otherwise, method 300 proceeds to step 318. At step 318, telemetry agent 177 sends telemetry data that identifies one or more ECMP-enabled RBVPNs handled by edge server 178 to telemetry service 186.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of identifying an equal cost multipath (ECMP)-enabled route-based virtual private network (RBVPN) in a virtualized computing system, comprises:
    obtaining, at a telemetry agent executing in an edge server of a data center, routes learned by an edge services gateway executing in the edge server;
    identifying, by the telemetry agent from the routes, a destination network and a plurality of next hops associated therewith and a plurality of virtual tunnel interfaces (VTIs) of the edge services gateway respectively associated with the plurality of next hops;
    identifying, by the telemetry agent for each of the plurality of VTIs, an associated virtual private network (VPN) session managed by the edge services gateway;
    grouping, by the telemetry agent, the VPN sessions identified as associated with the plurality of VTIs into an ECMP-enabled RBVPN;
    adding, by the telemetry agent, a description of the ECMP-enabled RBVPN to telemetry data; and
    sending, by the telemetry agent, the telemetry data to a telemetry service.

2. The method of claim 1, wherein the edge services gateway provides an interface to a logical network executing in a host cluster of the data center.

3. The method of claim 2, wherein the plurality of next hops are interfaces programmed on logical routers in the logical network.

4. The method of claim 1, wherein the next hops associated with the destination network each have an equal cost.

5. The method of claim 1, further comprising:
    presenting, by a user interface executing in the public cloud, a view of telemetry data to a user.

6. The method of claim 1, further comprising:
    identifying, by the telemetry agent for the VPN sessions, corresponding internet key exchange (IKE) sessions;
    adding information describing the IKE sessions to the telemetry data.

7. The method of claim 1, further comprising:
    assigning, by the telemetry agent, the VPN sessions to different processor cores of the edge server.

8. The method of claim 1, wherein the telemetry service executes in a public cloud in communication with the data center.

9. The method of claim 1, wherein the telemetry data indicates an anomaly, wherein the telemetry service receives user input in response to presentation of the anomaly, and wherein the telemetry service receives a configuration change to mitigate the anomaly.

10. A non-transitory computer readable medium comprising instructions to be executed in a computing device to cause the computing device to carry out a method of identifying an equal cost multipath (ECMP)-enabled route-based virtual private network (RBVPN) in a virtualized computing system, comprises:
    obtaining, at a telemetry agent executing in an edge server of a data center, routes learned by an edge services gateway executing in the edge server;
    identifying, by the telemetry agent from the routes, a destination network and a plurality of next hops associated therewith and a plurality of virtual tunnel interfaces (VTIs) of the edge services gateway respectively associated with the plurality of next hops;
    identifying, by the telemetry agent for each of the plurality of VTIs, an associated virtual private network (VPN) session managed by the edge services gateway;
    grouping, by the telemetry agent, the VPN sessions identified as associated with the plurality of VTIs into an ECMP-enabled RBVPN;
    adding, by the telemetry agent, a description of the ECMP-enabled RBVPN to telemetry data; and
    sending, by the telemetry agent, the telemetry data to a telemetry service.

11. The non-transitory computer readable medium of claim 10, wherein the edge services gateway provides an interface to a logical network executing in a host cluster of the data center.

12. The non-transitory computer readable medium of claim 11, wherein the plurality of next hops are interfaces programmed on logical routers in the logical network.

13. The non-transitory computer readable medium of claim 10, wherein the next hops associated with the destination network each have an equal cost.

14. The non-transitory computer readable medium of claim 10, further comprising:
    presenting, by a user interface executing in the public cloud, a view of telemetry data to a user.

15. A virtualized computing system, comprising:
    a public cloud including a telemetry service executing therein; and
    a data center having an edge server configured to execute a telemetry agent, the telemetry agent configured to:
        obtain routes learned by an edge services gateway executing in the edge server;
        identify, from the routes, a destination network and a plurality of next hops associated therewith and a plurality of virtual tunnel interfaces (VTIs) of the edge services gateway respectively associated with the plurality of next hops;
        identify, for each of the plurality of VTIs, an associated virtual private network (VPN) session managed by the edge services gateway;

group the VPN sessions identified as associated with the plurality of VTIs into an equal cost multipath (ECMP)-enabled route-based virtual private network (RBVPN);

add a description of the ECMP-enabled RBVPN to telemetry data; and send the telemetry data to a telemetry service.

16. The virtualized computing system of claim 15, wherein the edge services gateway provides an interface to a logical network executing in a host cluster of the data center.

17. The virtualized computing system of claim 16, wherein the plurality of next hops are interfaces programmed on logical routers in the logical network.

18. The virtualized computing system of claim 15, wherein the next hops associated with the destination network each have an equal cost.

19. The virtualized computing system of claim 15, wherein the telemetry agent is configured to:

identify, for the VPN sessions, corresponding internet key exchange (IKE) sessions;

add information describing the IKE sessions to the telemetry data.

20. The virtualized computing system of claim 15, wherein the telemetry agent is configured to:

assign the VPN sessions to different processor cores of the edge server.

* * * * *